US005745965A

United States Patent [19]

Stoltz et al.

[11] Patent Number: 5,745,965

[45] Date of Patent: May 5, 1998

[54] AMPUL AND AN AMPUL-FITTED THEFT-DETERRENT DEVICE

[75] Inventors: Klas Stoltz; Bo Gustavsson, both of Huddinge, Sweden

[73] Assignee: Färgklämman AB, Huddinge, Sweden

[21] Appl. No.: 721,017

[22] Filed: Sep. 26, 1996

[30] Foreign Application Priority Data

Jun. 27, 1996 [SE] Sweden ................................ 9602552

[51] Int. Cl.$^6$ ............................ F16B 21/00; E05B 65/00

[52] U.S. Cl. ......................... 24/704.1; 24/456; 24/704.2; 70/57.1

[58] Field of Search ............................... 24/704.1, 704.2, 24/527, 456; 70/57.1

[56] References Cited

U.S. PATENT DOCUMENTS

| | | | |
|---|---|---|---|
| 4,396,301 | 8/1983 | Stucki | 374/188 |
| 4,649,397 | 3/1987 | Heaton et al. | 70/57.1 |
| 4,881,088 | 11/1989 | Fisher, Jr. et al. | 346/140 R |
| 5,054,172 | 10/1991 | Hogan et al. | 70/57.1 |
| 5,347,262 | 9/1994 | Thurmond et al. | |
| 5,438,738 | 8/1995 | Stoltz et al. | |
| 5,517,180 | 5/1996 | Masi et al. | 340/573 |

FOREIGN PATENT DOCUMENTS

| | | |
|---|---|---|
| 9400429 | 4/1994 | Sweden . |
| WO 91/19874 | 12/1991 | WIPO . |

*Primary Examiner*—Victor N. Sakran
*Attorney, Agent, or Firm*—Browdy and Neimark

[57] ABSTRACT

The present invention relates to an ampul containing a marking substance and intended for use in a theft-deterrent device for theft-attractive goods. According to the invention, the ampul (2) encloses an alarm element (8) which can be sensed or detected by an electronic alarm system and which is inaccessible unless the ampul (2) is broken, crushed or destroyed in some other way such as to release the marking substance (4). The invention also relates to a theft-deterrent device which includes such an ampul.

16 Claims, 1 Drawing Sheet

AMPUL AND AN AMPUL-FITTED THEFT-DETERRENT DEVICE

Figure 1:
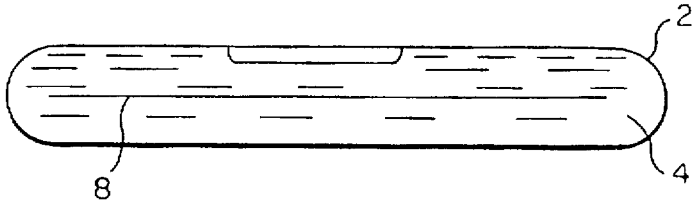

The present invention relates to an ampul intended for use with a theft-deterrent device for theft-attractive goods. The ampul contains a marking or staining substance and is arranged in a manner such as to be broken, crushed or destroyed in some other way and therewith release the marking substance enclosed in the ampul when an improper or unauthorized attempt is made to release the theft-deterrent device from the theft-attractive article. The invention also relates to a theft-deterrent device which includes such an ampul.

Theft deterrents are used with the intention of preventing or deterring theft of theft-attractive goods, such as clothing, bags, handbags, suitcases and other retail articles that can be easily carried. A device of this kind is intended to be attached to an item of goods in such a manner that the device can only be released with the aid of a special release device, to which potential thieves are assumed not to have access. Attempts to remove the theft-deterrent device without the aid of this special release device renders the goods practically unusable, either by virtue of the goods being torn or by virtue of a fragile ampul in the theft-deterrent device containing a marking substance bursting and releasing the substance and therewith mark or stain the goods or damage the goods in some other way.

Theft-deterrent devices of this kind may also be carriers of an alarm element that coacts with an alarm system which is activated by a sensor arrangement at the exits from the store in which the theft-protected goods are offered for sale. Theft-deterrent devices are often provided with an alarm element as an alternative to marking-substance containing ampuls. Theft-deterrent devices which include one or more marking-substance containing ampuls and also an alarm element complementary to the ampul/ampuls, also exist.

In this context, an alarm element is an element which is able to reflect certain frequencies that can be easily identified by a receiver and are contained in a signal transmitted from a transmitter. This property is utilized within anti-theft techniques, by placing at suitable positions in the store a transmitter/receiver which can identify or detect a theft-deterrent device securely attached to an item of goods and provided with an alarm element and therewith trigger an alarm.

The alarm element is normally fitted in the theft-deterrent device in a manner which prevents direct access to the element. The alarm element is normally placed between two plastic elements which are permanently joined together to form a casing, for instance by ultrasonic welding.

The function of the alarm elements is impaired or destroyed when the element is physically tampered with, for instance when the element is cut or pierced by a needle or some other sharp object. Thus, a theft-deterrent device can be made inoperative by making a hole in the plastic casing surrounding the alarm element with the aid of a knife or by burning a hole with the aid of a cigarette lighter for instance, so that the alarm element can be reached and damaged. The use of a tougher casing material, such as metal, is not practical because a metallic material will normally shut out or disturb the signals in the alarm system.

The object of the present invention is to reduce or eliminate the possibilities of rendering this type of theft-deterrent device non-functional. This object is achieved in accordance with the invention with an ampul and a theft-deterrent device having the features set forth in the following claims.

Figure 2:
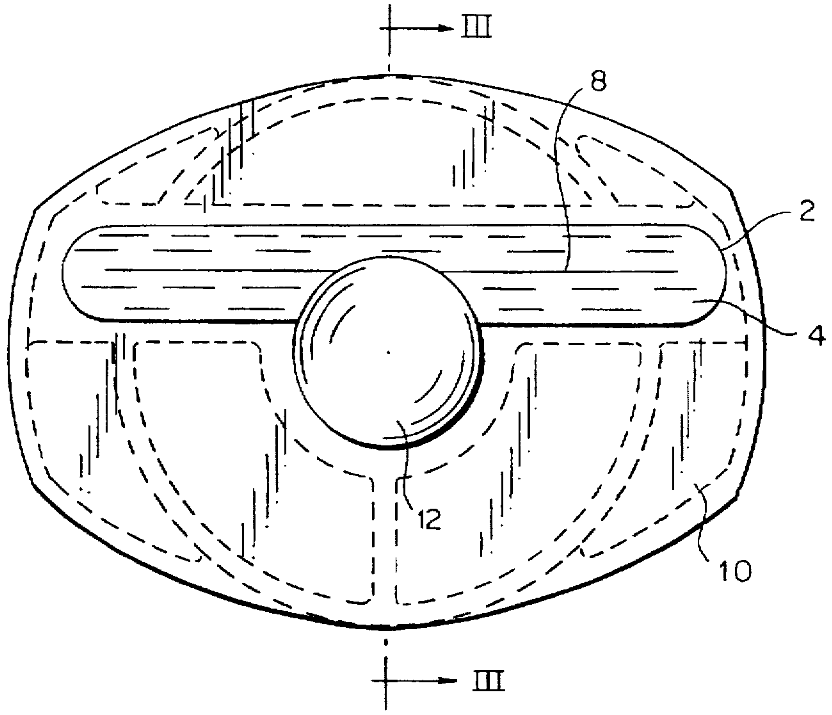
Figure 3:
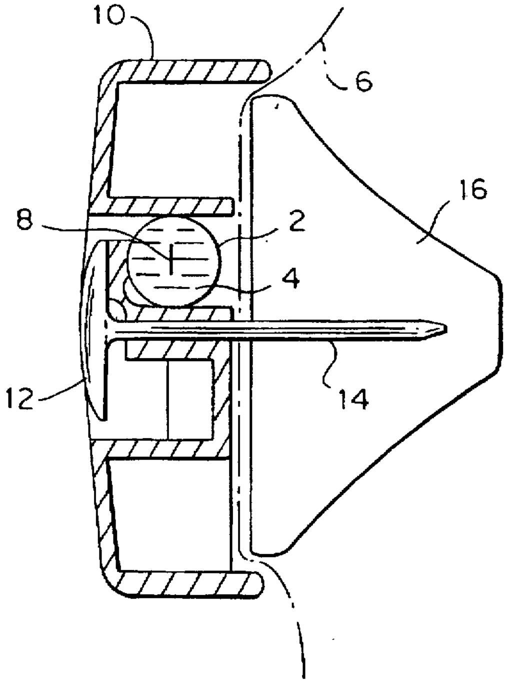

The invention will now be described in more detail with reference to an exemplifying embodiment thereof and also with reference to the accompanying drawing, in which FIG. 1 illustrates an ampul constructed in accordance with the invention;

FIG. 2 illustrates a theft-deterrent device fitted with an ampul in accordance with the invention from above; and FIG. 3 is a cross-sectional view of the theft-deterrent device taken on the line III—III in FIG. 2.

Shown in FIG. 1 is a tubular, circular-cylindrical ampul 2 made of glass or some other fragile material, for instance a fragile plastic material. The ampul contains a liquid-marking substance 4 in the form of a dye and/or an ill-smelling substance which is intended to stain or otherwise mark an item of goods 6 that comes into contact with said substance, or to destroy said item in some other way. The inner ampul pressure may be higher than atmospheric pressure, or may be at atmospheric pressure or at a pressure beneath atmospheric pressure.

The ampul 2 encloses an alarm element 8. This alarm element is preferably freely movable in the liquid substance 4, but may also be attached to the ampul 2 in some suitable way, so as to fixate the position of the element in the ampul. In this latter regard, the alarm element 8 may conceivably be moulded in the ampul wall and may also be placed in the wall so as to be out of direct contact with the substance 4 in the ampul 2. An essential feature of all of the aforesaid alternatives is that the alarm element cannot be reached without breaking the ampul and releasing the marking or staining substance. Thus, by an alarm element enclosed in the ampul is meant both an alarm element located in the marking substance inwardly of the ampul walls and an alarm element embodied in the wall of the ampul.

The alarm element 8 has the form of a thin wire or filament of round, flat or some other suitable profile. The wire or filament is preferably made of an amorphous metal alloy having electromagnetic properties, although the use of other materials is also possible within the scope of the invention. The alarm element may also carry information which is appropriate in the present context and which can be read by a sensor arrangement installed in the store. The ampul 2 may also enclose several alarm elements 8, of which one or more may function to reflect the signal sent by the transmitter, while another element functions as an information carrier.

FIGS. 2 and 3 illustrate by way of example a theft-deterrent device provided with an ampul 2 in accordance with the invention.

The theft-deterrent device includes a first unit 10 having a base element 12 and an elongated connecting element 14 which projects out from the base element and which is intended to be inserted through the item of goods 6 to be protected. A second unit 16 (shown only schematically in FIG. 3) is intended to be fitted to the connecting element 14 and locked thereto against movement in a direction away from the base element 12, so as to hold the theft-deterrent device securely to said goods. One of the units, in the illustrated case the first unit 10, will include an anti-theft device.

According to the present embodiment of the invention, the anti-theft device is comprised of a fragile ampul which contains a liquid or powdery marking substance and an alarm element which is disposed in said substance and which can be sensed or detected in an electronic alarm system. The ampul is positioned so as to be clearly visible from outside the theft-deterrent device. A potential thief is thus able to see both the marking substance and the alarm element in the ampul, which naturally has a deterring effect.

Should an attempt be made to loosen the second unit 16 from the connecting element 14 by force, the pulling forces and lateral forces thus exerted on the unit 16 and, consequently also on the connecting element 14 and the base element 12, will cause the ampul 2 to fracture or burst. When the ampul 2 fractures or bursts, the marking substance 4 will spread to the goods 6, thereby destroying the goods and rendering the same unusable. The ampul 2 will also burst or fracture if an improper or unauthorized attempt is made to render the alarm element 8 inoperative, therewith causing the marking substance 4 to destroy the goods 6.

It will be understood that the invention is not restricted to the aforedescribed exemplifying embodiment thereof and that several conceivable modifications of the invention are possible within the scope of the following claims. For instance, the theft-deterrent device may be constructed to act solely as a carrier of an alarm element for coaction with an electronic alarm system. In this case, the ampul containing the marking substance and the alarm element may be arranged in the device in a simpler manner than when the ampul is intended to be broken when an unauthorized attempt is made to remove the device from the item of goods to which it is attached. The theft-deterrent device may also include several ampuls which may have mutually the same or alternative functions. Thus, each ampul may be arranged in the theft-deterrent device so as to function solely as an alarm element carrier or solely intended to be broken when an improper attempt is made to remove the theft-deterrent device from said goods, or so that it includes both functions. The ampul may also contain more than one alarm element having the same or alternative functions.

We claim:

1. An ampul which contains a marking substance (4) and which is intended for use in a theft-deterrent device for attachment to theft-attractive goods (6), characterized in that an alarm element (8), which can be detected or sensed by a remote electronic alarm system, is enclosed in the ampul (2) and is inaccessible unless the ampul (2) is broken, crushed or damaged in some other way such as to release the marking substance (4).

2. An ampul according to claim 1, characterized in that the ampul (2) is made of glass or plastic.

3. An ampul according to claim 2, characterized in that the alarm element (8) is freely movable in the marketing substance (4) contained in the ampul (2).

4. An ampul according to claim 3, characterized in that the alarm element (8) is comprised of a metal wire or filament having electromagnetic properties.

5. An ampul according to claim 2, characterized in that the alarm element (8) is fixedly mounted in the ampul (2) or in the ampul wall.

6. An ampul according to claim 5, characterized in that the alarm element (8) is comprised of a metal wire or filament having electromagnetic properties.

7. An ampul according to claim 1, characterized in that the alarm element (8) is freely movable in the marking substance (4) contained in the ampul (2).

8. An ampul according to claim 1, characterized in that the alarm element (8) is fixedly mounted in the ampul (2) or in the ampul wall.

9. An ampul according to claim 1, characterized in that the alarm element (8) is comprised of a metal wire or filament having electromagnetic properties.

10. A theft-deterrent device for use with theft-attractive goods and including at least one ampul (2) containing a marking substance (4), characterized in that the ampul (2) encloses an alarm element (8) which can be sensed or detected by a remote electronic alarm system and which is inaccessible unless the ampul (2) is broken, crushed or destroyed in some other way such as to release the marking substance (4).

11. A device according to claim 10, characterized in that the ampul (2) is arranged so as to be broken, crushed or destroyed in some other way and therewith release the marking substance (4) enclosed therein when an improper attempt is made to release the device from the theft-attractive goods (6).

12. A device according to claim 11, characterized in that the ampul (2) is made of glass or plastic.

13. A device according to claim 12, characterized in that the alarm element (8) is freely movable in the marking substance (4) contained by the ampul (2).

14. A device according to claim 12, characterized in that the alarm element (8) is fixedly mounted in the ampul (2) or in the ampul wall.

15. A device according to claim 10, characterized in that the alarm element (8) is freely movable in the marking substance (4) contained by the ampul (2).

16. A device according to claim 10, characterized in that the alarm element (8) is fixedly mounted in the ampul (2) or in the ampul wall.

* * * * *